UNITED STATES PATENT OFFICE.

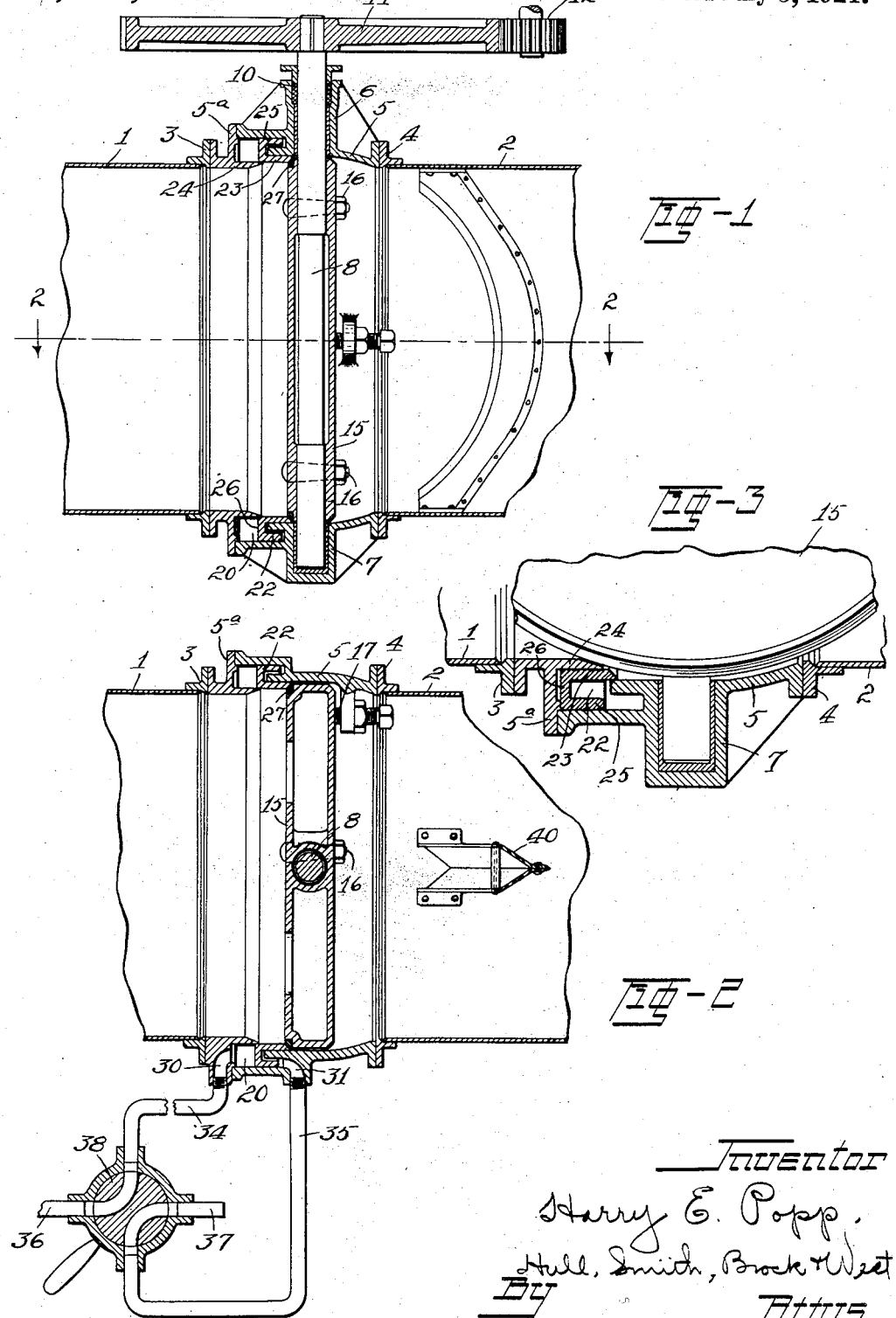

HARRY E. POPP, OF EAST CLEVELAND, OHIO.

VALVE.

1,383,482.  Specification of Letters Patent.  Patented July 5, 1921.

Application filed April 20, 1918. Serial No. 229,714.

*To all whom it may concern:*

Be it known that I, HARRY E. POPP, a citizen of the United States, residing at East Cleveland, in the county of Cuyahoga and State of Ohio, have invented a certain new and useful Improvement in Valves, of which the following is a full, clear, and exact description, reference being had to the accompanying drawings.

This invention relates to an improved quick opening and closing valve that is peculiarly suitable for use in high pressure hydraulic systems, such as water works, hydro-electric developments, and similar installations; and the invention has for its objects to provide a valve, particularly of the "butterfly" type, wherein an auxiliary valve is incorporated to effectually seal the main valve; wherein the valve disk or main valve fits loosely enough to provide a by-pass that is adapted to be closed by the aforesaid auxiliary valve; wherein the pressure against the disk or main valve is partially resisted by the auxiliary valve thereby relieving the main valve of the great strain that would otherwise be constantly imposed upon it, when closed; to provide a comparatively simple construction that is convenient of operation and through which the foregoing objects may be attained; and to include a deflector behind which the valve disk reposes when in "open" position for diverting the current about the disk and thereby relieving it of the lateral pressure to which it would otherwise be subjected.

In the class of work to which my improved valve is especially adapted, it is desirable and customary to provide a by-pass around the valve through which the normal high pressure may be relieved somewhat before the main valve is opened in order to lessen the resistance to the opening of the valve and relieve it of undue strains occasioned by the high velocity of the current when the valve is partly open. This is taken care of in my present design, as above intimated, by making the valve disk of a sufficiently loose fit to permit leakage about the disk when the auxiliary valve is unseated.

In the drawing accompanying and forming a part hereof I have shown a construction through which the foregoing objects, and others which will become apparent as this description proceeds, are attained; and while I shall proceed to describe this construction in detail, I wish to be understood as not limiting myself to the structural details thereof further than is required by the terms of the claims annexed hereto.

In the drawing, Figure 1 is a central vertical section through my improved valve, the plane of section extending longitudinally of the pipe or conduit in which the valve is shown as incorporated; Fig. 2 is a section at right angles to Fig. 1, the plane of section being indicated by the line 2—2 of the former figure; and Fig. 3 is an enlarged sectional detail, corresponding to the lower portion of Fig. 1, and showing the parts in "open" position.

1 and 2 are sections of a pipe or conduit which connect, through the respective flanges 3 and 4, with the opposed sides of the valve casing 5. This casing is annular and has opposed bearings 6 and 7 within which are journaled the ends of a shaft or stem 8, the former being provided with the usual packing gland 10. Any suitable means may be employed for turning the shaft or stem 8. In the present instance the shaft or stem is shown as equipped with a gear wheel 11 that may be driven from any suitable source of power, through a pinion 12.

Within the casing 5, the shaft or stem 8 has fixed to it a disk 15, as by means of tapered pins or keys 16; and when in closed position, one edge of the disk may engage a stop 17, herein shown as adjustable.

The casing 5 contains an annular chamber 20, the axis whereof is coincident with that of the conduit or pipe, and the open end of the chamber is closed by the casing section 5ª. A ring piston 22 is slidable within the chamber 20 and comprises an inner flange 23 which is slidable along the wall extension 24 of the casing section 5ª, and an outer flange 25 which slidably engages the outer wall of the chamber 20. The head of the piston is formed by the annular wall 26 which connects the flanges 23 and 25, and the edge of the former flange remote from the wall 26 is shaped to accurately fit a valve seat 27 which is shown as set into the adjacent face of the disk 15, about its periphery.

As shown in Fig. 2, a port 30 leads into what I may term the rear end of the chamber 20 through the wall of the casing section 5ª while a similar port 31 opens into the opposite end of the chamber through a part of the casing 5. Pressure fluid may be supplied to or exhausted from the chamber 20 through the pipes 34 and 35 which connect, respectively, with the ports 30 and 31, and which are adapted to be communicatively connected with a supply pipe 36, or with an exhaust 37, through a four-way valve illustrated conventionally at 38. The pressure fluid may be obtained from any suitable source, as from the line or conduit containing the main valve.

The main valve is illustrated in Figs. 1 and 2, as closed. To open it, the four-way valve 38 is turned through 90 degrees to communicatively connect the tube 34 with the exhaust 37, and the tube 35 with the supply pipe 36. The pressure fluid will now flow into the forward end of the chamber 20, while the opposite end is being exhausted, and retract the ring piston 22, which constitutes the auxiliary valve, thereby to completely remove the auxiliary valve from the scope of movement of the main valve or disk 15, in which condition the auxiliary valve is shown in Fig. 3. Immediately upon the retraction of the auxiliary valve, leakage is permitted about the periphery of the valve disk, somewhat relieving the high pressure which, in the present arrangement exists within the section 2 of the pipe or conduit, so that with comparative ease the main valve may be swung through 90 degrees, or until the plane of the disk is substantially coincident with the longitudinal axis of the conduit, when the edge of the disk that is presented to the pressure head reposes behind and is shielded by a deflector 40, shown as extending diametrically across the conduit section 2 in the plane of the disk. From this description it will be obvious that to close the valve the foregoing operations are reversed.

Attention is called to the fact that in the present preferred arrangement the auxiliary valve or ring piston 22 is situated on the side of the valve disk 15 opposite that subjected to the pressure of the line, so that any force applied to the auxiliary valve or piston in seating it will be imparted to the disk to assist it in withstanding such pressure.

Having thus described my invention, what I claim is:—

1. In a valve of the character set forth, the combination of a casing, a disk pivotally supported within the casing on an axis extending transversely thereof, and an auxiliary annular valve movable within the casing longitudinally of the axis thereof into engagement with the periphery of the disk, thereby to close the joint between the disk and casing.

2. In a valve of the character set forth, the combination of a casing, a disk pivotally supported within the casing on an axis extending transversely thereof, the casing containing a chamber, a piston reciprocable within the chamber and having a portion arranged to engage the periphery of the disk when the same reposes transversely of the casing thereby to close the joint between said disk and the wall of the casing, and means for introducing pressure fluid into and exhausting it from the aforesaid chamber.

3. In a valve of the character set forth, the combination of an annular casing having opposed bearings, a shaft extending diametrically through the casing and journaled within said bearings, means for turning said shaft, a disk secured to the shaft inside the casing, the casing having an annular chamber the axis whereof is coincident with that of the casing, a ring piston reciprocable within said chamber and having a portion for coöperation with a peripheral valve seat of the disk, and means for supplying a pressure fluid to and exhausting it from said annular chamber thereby to reciprocate the piston as and for the purpose described.

4. In a valve of the character set forth, the combination of an annular casing, a shaft extending diametrically therethrough and journaled within bearings of the casing, a disk secured to the shaft inside the casing, an auxiliary valve element constituting an annulus which is movable toward and from the disk and having a portion for engagement with the periphery thereof when the disk reposes transversely of the casing, said auxiliary valve element being situated on the side of the disk opposite that designed for subjection to the line pressure, and means for forcing the auxiliary valve element into engagement with the peripheral portion of the disk.

5. In a valve of the character set forth, the combination of a casing, a disk pivoted on an axis extending diametrically through the casing, means for turning the disk from a transverse position within the casing into a plane at substantially right angles thereto, and a deflector immovably supported transversely of and substantially on the longitudinal axis of the casing to shield the edge of the disk from the velocity of the stream when the disk is in the latter position.

6. In a valve of the character set forth, the combination of a casing, a disk pivotally supported therein on an axis extending transversely of the casing, the edge portion of the disk being so disposed to the wall of the casing as to provide a by-pass, an auxiliary valve for closing said by-pass, and means for opening and closing the auxiliary valve.

7. In a valve of the character set forth, the combination of a casing, a disk pivotally supported within the casing on an axis extending transversely thereof, an auxiliary valve carried by one of said elements, the other of said elements having a valve seat into contact with which the auxiliary valve may be moved for closing the joint between the disk and casing, and pressure fluid means for projecting the auxiliary valve into engagement with and for retracting it from said valve seat.

8. In a valve of the character set forth, the combination of a casing, a disk pivotally supported within the casing on an axis extending transversely thereof, one of said elements having a valve seat and the other an annular chamber, a piston within said chamber, and means for introducing pressure fluid into said chamber for forcing the piston into contact with the aforesaid valve seat.

In testimony whereof, I hereunto affix my signature.

HARRY E. POPP.